(United States Patent [19])

Sinka et al.

[11] 4,021,365
[45] May 3, 1977

[54] SILICA BASE DEFOAMER COMPOSITIONS WITH IMPROVED STABILITY

[75] Inventors: Joseph V. Sinka, Mendham; Irwin A. Lichtman, Oradell, both of N.J.

[73] Assignee: Diamond Shamrock Corporation, Cleveland, Ohio

[22] Filed: July 18, 1975

[21] Appl. No.: 597,149

Related U.S. Application Data

[63] Continuation of Ser. No. 326,570, Jan. 24, 1973, abandoned.

[52] U.S. Cl. ............................. 252/321; 252/358
[51] Int. Cl.² ...................................... B01D 19/04
[58] Field of Search ........................ 252/321, 358

[56] References Cited

UNITED STATES PATENTS

| 3,076,768 | 2/1963 | Boylan | 252/358 |
| 3,152,081 | 10/1964 | Ovist et al. | 252/321 |
| 3,697,440 | 10/1972 | Lichtman | 252/321 |
| 3,705,859 | 12/1972 | Boylan | 252/358 |
| 3,923,683 | 12/1975 | Michalski et al. | 252/321 |

*Primary Examiner*—Leland A. Sebastian
*Attorney, Agent, or Firm*—Leslie G. Nunn

[57] ABSTRACT

Defoamer compositions having improved stability are prepared from hydrophobic silica, quick-chilled amides, and hydrocarbon oil, with oil soluble organic polymers and surface-active additives as optional ingredients. These compositions are useful in defoaming aqueous systems including paper pulp black liquors, water-base paints, and adhesives.

15 Claims, No Drawings

SILICA BASE DEFOAMER COMPOSITIONS WITH IMPROVED STABILITY

This is a continuation, of application Ser. No. 326,570, filed Jan. 24, 1973 now abandoned.

BACKGROUND OF THE INVENTION

1. Field of the Invention

This invention relates to stabilized silica-base defoamer compositions and their use in aqueous systems.

2. Description of the Prior Art

Silica-base defoamers are well known as defoamers for aqueous systems. One of the problems of such defoamers, however, is the tendency for the silica particles to settle out of the carrier liquid (usually a hydrocarbon or natural oil) in which they are suspended. Only the use of extremely fine particle silica achieves some degree of stability. However, fien particle silica is of limited supply and is more expensive than other grades.

Quick-chilled amides are also well known as defoamers for aqueous systems. In addition, it is known to use mixtures of silica and quick-chilled amides, where each is present in defoaming quantities.

The following patents disclose the defoaming properties of various components of the subject compositions, but none teach their combination for the purpose of increasing the stability of silica-based defoamers.

U.S. Pat. No. 3,076,768 (Boylan) discloses silica-base defoamers containing hydrophobic silica, hydrocarbon oil, and a spreading agent.

U.S. Pat. No. 3,207,698 (Liebling and Canaris) discloses silica-base defoamers containing hydrophobic silica of a particular nature and hydrocarbon oil.

U.S. Pat. No. 3,652,453 (MacDonnell) discloses amide-base defoamers containing quick-chilled amides, hydrocarbon oil, and oil-soluble organic polymers.

U.S. Pat. No. 3,677,963 (Lichtman and Rosengart) discloses amide-base defoamers containing quick-chilled amides, hydrocarbon oil, oil-soluble organic polymers and fats.

SUMMARY OF THE INVENTION

The defoamer compositions of this invention are basically hydrophobic silica and oil mixtures, to which have been added a relatively small amount of quick-chilled amide for the purpose of increasing their stability. Optionally, oil soluble organic polymers and surface-active additives may be added.

The silica must be rendered hydrophobic, by roasting with silicone oil or by other means. The hydrophobic silica and oil contain almost the entire defoaming properties of these compositions.

The amide, which must be quick-chilled as described herein, is used solely for stabilizing the defoamer composition. That is, it has been unexpectedly discovered that the addition of a small quantity of quick-chilled amide acts to stabilize the defoamer by keeping the silica particles in suspension for a considerably longer time than in its absence. Of course, the quick-chilled amide does possess defoaming capabilities of its own. However, the amount of quick-chilled amide used is not sufficient to increase the effectiveness of the defoamer appreciably.

The defoamer compositions of this invention may be manufactured by simply mixing the fully prepared ingredients or may be prepared partially in situ.

The compositions of this invention are useful to some degree in almost all aqueous systems in which defoaming is a problem. Such uses include: boiler water; sugar beet refining; paper manufacture; textile manufacture; adhesives; cement; and coatings. These defoamer compositions are particularly useful in defoaming the black liquor found in paper pulp processing, and for the prevention of air entrainment in water-base paints and adhesives.

DESCRIPTION OF THE PREFERRED EMBODIMENTS

A. Ingredients

1. Hydrophobic Silica

The hydrophobic silica useful in this invention may be prepared from any of the well-known forms of silica such as: (1) silica aerogel, a colloidal silica which may be prepared by displacing the water from a silica hydrogel by a low-boiling, water-miscible, organic liquid, heating in an autoclave or the like above the critical temperature of the liquid, and then venting the autoclave, (2) so-called fume silica, a colloidal silica obtained by burning silicon tetrachloride and collecting the resulting silica smoke, (3) a precipitated silica prepared by the destabilization of a water-soluble silica under conditions which do not permit the formation of a gel structure, but rather cause the flocculation of silica particles into coherent aggregates such as by the addition of sodium ions to a sodium silicate solution; as well as aluminum silicate, copper silicate, magnesium silicate, zinc silicate, and the like. Almost any grade and particle size of silica is useful although finer particles are preferred. Hydrophilic inorganic particles which might be expected to be silica substitutes such as calcium hydroxide, magnesium hydroxide and calcium carbonate were found not to be useful.

Any suitable method may be employed for treating the normally hydrophilic silica to render it hydrophobic. One method which has proved very satisfactory involves spraying the silica with silicone oil and heating at elevated temperature, i.e., from about 250° C. to about 350° C, for about ½ to about 2 hours. The amount of silicone oil utilized may vary from about 5% to about 100% by weight based on the weight of the silica. However, amounts from about 7 to about 25% will usually be satisfactory and are preferred.

The silicone oil can be a polysiloxane oil such as an alkyl, aryl, alicyclic or aralkyl siloxane or polysiloxane having a viscosity of from about 10 to about 3000 centistokes at 25% C. Preferred silicone oils include alkyl polysiloxanes having viscosities of from about 40 to about 100 centistokes at 25° C. These alkyl polysiloxanes include dimethyl polysiloxane, diethyl polysiloxane, dipropyl polysiloxane, methyl ethyl polysiloxane, dioctyl polysiloxane, dihexyl polysiloxane, methyl propyl polysiloxane, dibutyl polysiloxane, didodecyl polysiloxane or the like.

The finely divided silica may also be rendered hydrophobic by treatment with vapors of an organo-silicon halide or mixture of organo-silicon halides. Examples of organo-silicon halides suitable for this purpose are given in U.S. Pat. Nos. 2,306,222 and 2,412,470 and include alkyl (methyl), aryl (phenyl), alkaryl (tolyl) and aralkyl (phenyl methyl) silicon halides. The treatment may be carried out by agitating the finely divided material in a closed container in the presence of vapors of the treating material, e.g., dimethyl dichlorosilane. The amount of treating material and the length of treatment will depend upon the surface area of the inorganic material and the nature of the organo-silicon halide employed. In general, it will be satisfactory to use from about 5 to about 15% by weight of treating agent based on the weight of silica and a time of treatment from about ½ hour to about 2 hours.

Still another method of rendering the silica hydrophobic is by dispersing it in silicone oil, i.e., in a concentration from about 2–10% and heating the dispersion to about 250°–300° C. for about an hour more or less. The hydrophobic silica may then be extracted by centrifuging the mixture after dilution with hexane or a similar type of solvent and drying the resulting solid.

The hydrophobic silica utilized will desirably have an average particle size less than about 10 microns and preferably less than about 5 microns. Most preferred is an average particle size from about 0.02 micron to about 1 micron.

Measuring the particle size in terms of Oil Absorption Value, 125 (grams of oil absorbed per 100 grams of silica) is the minimum useful value and a value of 170 or higher is preferred.

2. Carrier Liquid

The carrier liquid can be any substnace which is inert towards the other ingredients, immiscible with water, liquid at room temperature and atmospheric pressure, and which has a viscosity of from about 30 to about 400 SUS (Saybolt Universal Seconds at 38° C).

Although any substance meeting the above criteria can be used, the preferred carrier liquids are natural oils, mineral oils and hydrocarbons.

Examples of preferred carrier liquids include, but are not limited to: mustard seed oil, castor oil, rice bran oil, soya oil, corn oil, mineral seal oil, stoddard solvent, petroleum naphtha, paraffinic mineral oil, naphthenic mineral oil, toluene, xylene, benzene, hexane, heptane, octane, dodecane, kerosene, and the like. If desired, mixtures of two or more carrier liquids can be used. An especially preferred carrier liquid is paraffinic mineral oil.

It should be noted that the carrier liquid when used in quick-chilling the amide must have a minimum boiling point equal to the melting point of the amide and an average of from about 6 to about 25 carbon atoms.

3. Quick-Chilled Amide Stabilizer

A great many amides are useful in this invention, provided that they have been "Quick-Chilled" as herein defined.

Useful amides include those obtained by reaction of a polyamine containing at least one alkylene group having from two to six carbon atoms and a fatty acid having from six to eighteen carbon atoms. One example is the amide obtained by reaction of a polyamine and a fatty acid or mixture of fatty acids such as hexanoic, decanoic, lauric, palmitic, oleic, and stearic acids, hydroxy acids such as ricinoleic acid, or naphthenic acids such as are obtained as byproducts from the refining of petroleum. Natural mixtures of fatty acids such as, tall oil acids, tallow fatty acids and the like also can be used. Suitable amines include ethylene diamine, butylene diamine, diethylene triamine, triethylene tetramine, hexamethylene diamine, decamethylene diamine, hydroxyethyl ethylene diamine, 1:3-diamino-2-propanol or the like.

Monoamine are not useful in this invention.

One of the amides useful herein is prepared in the following manner. 95.7 parts by weight of bleached-hydrogenated tallow fatty acids is charged into a stainless steel reactor with a condenser, water trap and agitator. The entire process including charging of reactants and cooling of the reaction product is carried out under nitrogen atmosphere. The acids charge is heated to about 165°–175° C. and 10.1 parts by weight of ethylene diamine is added with agitation. After the diamine is added, the reaction mixture is heated to about 180°–185° C. The mixture is reacted at about 180°–185° C until the acid value is less than 5 and the alkalinity less than 0.6% by weight. The resulting reaction product of ethylene diamine and tallow fatty acid is then cooled to room temperature. If desired, the cooled mass can be ground to obtain the product in the form of a very fine powder.

The "Quick-Chilling" Process is essentially the same as that described in U.S. Pat. Nos. 3,652,453 and 3,677,963, which descriptions are hereby incorporated by reference. The difference between the quick-chilling processes in the above patents and the process used in this invention is that in this invention the amide is not combined with other ingredients in the melt other than the carrier liquid. The quick-chilling process consists of heating the amide to above its melting point, maintaining the amide in a molten state for at least 15 minutes, and then rapidly quick-chilling the amide by: (a) adding a colder carrier liquid or water; (b) rapidly dropping the melt into colder liquid; or (c) applying the melt to a cold surface and adding the resulting coagulate to a carrier liquid. Optionally, the amide may be mixed with some of the carrier liquid before heating, in which case the mixture should be heated to a temperature where the amide is fully dissolved and then maintained at that temperature for at least 15 minutes. It is important in either case that the amide be heated long enough for any crystalline nuclei to be destroyed, so that the amide may more readily assume the desired new crystalline structure formed by the quick-chilling process. The term "colder" is defined as room temperature (22° C) or below.

4. Oil Soluble Polymer

Almost any oil soluble polymers are useful to some degree in this formulation and include vinyl acetate copolymerized with ethylenically unsaturated comonomers which are copolymerizable therewith such as maleic and fumaric acid esters, ethylene, propylene and butylene; polyalkylene oxide adducts such as methyl glucoside propoxylated with four moles of propylene oxide; glycerine propoxylated with fifteen moles of ethylene oxide and 45 moles of propylene oxide; the copolymer of lauryl methacrylate and vinyl pyrrolidone; methacrylate copolymers dissolved in solvent-refined (100 SUS at 38° C.) neutral oil; and phenol modified coumaroneindene resins. These materials can be used alone or in admixture with each other.

One oil soluble polymer which is preferred is a copolymer of vinyl acetate and fumaric acid esterified with a tallow alcohol. Such an oil soluble polymer is available from Enjay Chemical Co. in the form of a mineral oil solution thereof under the trademark "Paratone 440" which consists of about 25 parts of weight of said copolymer in 75 parts by weight of a liquid hydrocarbon. This product has the following properties:

| | |
|---|---|
| Viscosity at 98.9° C., cs. | 1300 |
| Flash Point, COC, ° C. | 182 |
| Color, ASTM | 40 |
| Specific Gravity at 15.6° C. | 0.92 |

Another preferred oil soluble polymer is a copolymer of styrene and a polyester. Such an oil soluble polymer is available from The Lubrizol Corporation in the form of a paraffin oil solution thereof under the trademark "Lubrizol 3702" which consists of about 30 parts by weight of said copolymer in /0 parts by weight of liquid hydrocarbon. This product has the following properties:

| | |
|---|---|
| Viscosity at 98.9° C., SUS | 3800 |
| Viscosity at 98.9° C., cSt | 815 |
| Specific Gravity 15.6° C. | 0.905 |

Still another preferred oil soluble polymer is a copolymer of alkyl methacrylate and N-vinyl pyrrolidone. Such as oil soluble polymer is available from Rohm and Haas Company in the form of a neutral oil solution thereof under the trademark "Acryloid 966" which consists of about 30 parts by weight of said copolymer in 70 parts by weight of liquid hydrocarbon. This product has the following properties:

| | |
|---|---|
| Viscosity at 98.9° C., SUS | 3730 |
| Viscosity at 98.9° C., cSt | 800 |
| Flash Point, COC, ° C | 192.5 |
| Color, ASTM | 3 |
| Specific Gravity at 15.6° C | 0.899 |

When an oil soluble polymer is used, the amount of hydrophobic silica may be reduced to about 4 to 7% by weight in order to lower the viscosity. The defoaming efficacy of the composition remains the same despite the reduction. The acceptable viscosity range for the compositions of this invention is 200 to 2,000 cs, with a preferred range of 400 to 600 cs.

5. Surface-Active Additives

Optional surface-active additives useful in this invention may function as spreading and/or emulsifying agents and may be anionic, cationic or nonionic. The particular type of surface-active additive to be utilized is determined to some extent by the type of system in which it is used. In general, the anionics appear to give the best defoaming efficiencies and are preferred. Examples of suitable anionics are fatty acids containing from about 12 to about 22 carbon atoms such as stearic and soaps of these fatty acids such as the alkali metal, alkali earth metal, aluminum, ammonium and amine soaps, e.g., triethanolamine stearate, as well as rosin soaps. The soaps may be added as such or formed in situ. Examples of other suitable anionics are alkali metal salts of alkyl-aryl sulfonic acids, sodium dialkyl sulfo-succinate, sulfated or sulfonated oils, e.g., sulfated castor oil, sulfonated tallow, and alkali metal salts of short chain petroleum sulfonic acids.

Examples of suitable cationics are salts of long chain primary, secondary, or tertiary amines, such as oleylamine acetate, cetylamine acetate, di-dodecylamine lactate, the acetate of monostearoyl diethylene triamine, dilauryl triethylene tetramine diacetate, 1-aminoethyl-2-heptamcenyl imidazoline acetate; and quaternary salts, such as morpholinium ethyl sulfate, cetylpyridinium bromide, hexadecyl ethyl morpholinium chloride, and diethyl diodecyl ammonium chloride.

Examples of suitable nonionics are silicone oils as defined herein, condensation products of higher fatty alcohols with ethylene or propylene oxide, such as the reaction products of butyl alcohol with 30 propylene oxide units or of cetyl alcohol with 8 ethylene oxide units; condensation products of alkylphenols with ethylene oxide, such as the reaction product of isooctylphenol with 12 ethylene oxide units; condensation products of higher fatty acid amides with 5 or more ethylene oxide units; polyethylene glycol esters of long chain fatty acids, such as tetraethylene glycol monopalmitate, hexaethyleneglycol monolaurate, nonaethyleneglycol monostearate, nonaethylene-glycol dioleate, tridecaethyleneglycol monoarchidate, tricosaethylene glycol monobehenate, tricosaethyleneglycol dibehenate, ethylene oxide condensation products of polyhydric alcohol partial higher fatty acid esters, and their inner anhydrides (mannitol-anhydride and sorbitol-anhydrate), such as glycerol monopalmitate reacted with 10 molecules of ethylene oxide, pentaerythrito) monooleate reacted with 12 molecules of ethylene oxide, sorbitan monostearate reacted with 10 to 15 molecules of ethylene oxide, mannitan monopalmitate reacted with 10 to 15 molecules of ethylene oxide; long chain polyglycols in which one hydroxyl group is esterified with a higher fatty acid and the other hydroxyl group is etherified with a lower alcohol, such as methoxypolyethylene glycol 550 monostearate (550 meaning the average molecular weight of the polyglycol ether). Combinations of two or more surface-active additives may be used provided that anionics are not blended with cationics.

B. Process of Manufacture

1. Partial In Situ Method

In this process, the hydrophobic silica is first mixed with the carrier liquid, which has been heated in order to keep the silica particles in suspension. The suspension is then cooled to room temperature or below and the amide (optionally containing some carrier liquid) which has been melted and maintained as a melt for at least 15 minutes, is quick-chilled by rapidly adding it to the suspension. The suspension/amide mixture is then homogenized while at room temperature at a pressure of 1,000 to 5,000 p.s.i., preferably 1,5000 to 3,250 p.s.i., and particularly preferably at 3,000 p.s.i. Homogenization can also be undertaken while the mixture is at a higher temperature, in which case the pressure can be higher. Unexpectedly, it was discovered that the homogenization can be at a higher pressure for a silica/-carrier liquid/amide mixture than for a carrier liquid/amide mixture. After homogenization, the oil soluble polymer and surface-active additive may optionally be added.

2. Simple Mixture Method

In this process, the hydrophobic silica is first mixed with the carrier liquid which has been heated in order to keep the silica particles in suspension. The suspension is then cooled to room temperature. The amide, which has already been quick-chilled separately, it then simply mixed with the suspension and the mixture is homogenized and optional ingredients are added, in the same manner as in the Partial In Situ Method. Alternatively, the quick-chilled amide-carrier liquid mixture and the silica/carrier liquid mixture may be homogenized separately and then blended, in which case further homogenization is not necessary.

C. Parameters of Ingredients and Process of Manufacture

All of the following ingredient parameters are in terms of % by weight based upon a 100% composition.

The hydrophobic silica should be present in from about 3 to about 20% and preferably about 4 to 11%.

The quick-chilled amide should be present in from about 0.1 to about 2.0% and preferably about 0.8 to about 1.2%.

The oil soluble polymer may be present in up to about 25% and preferably about 8 to 12%.

The surface-active additive may be present in up to about 3.0% and preferably about 0.5 to about 2.5%.

The carrier liquid is present in the amount which is the differential between all of the above ingredients and 100%.

D. Representative Compositions Within the Scope of this Invention

EXAMPLE I

Nine parts (36g) of hydrophobic silica having a mean particle diameter of 22 millimicrons were added to 75.5 parts (302 g) of paraffinic mineral oil which had been heated to 100° C. After agitation, the mixture was cooled to room temperature (about 22° C) forming a silica in oil suspension of limited stability. One half part (2.0 g) of an amide comprising the reaction product of ethylenediamine and tallow fatty acid was mixed separately with 15 parts (60 g) of mineral oil, heated to 140° C, and maintained at that temperature for 15 minutes. The amide/oil mixture at 140° C was then quick-chilled by rapidly adding it to the silica/oil suspension at 22° C, forming a mixture of hydrophobic silica, quick-chilled amide, and mineral oil. The mixture was then homogenized to achieve a uniform suspension.

EXAMPLE II

A composition was prepared according to Example I with the following exceptions. Ten parts of silica was suspended in 75.5 parts of mineral oil, 1.0 part of amide was melted with 10 parts of mineral oil, 2.0 parts of propoxylated butanol (30 P.O.) was added before homogenization and 0.3 parts of silicone oil was added after homogenization, as surface active agents.

EXAMPLE III a. A composition was prepared according to Example I with the following exceptions. Five parts of silica was suspended in 71.7 parts of mineral oil, 1.0 part of amide was melted with 10.0 parts of mineral oil, and 2.0 parts of propoxylated butanol (30 P.O.) was added before homogenization.

b. To Composition (a), above, was added 0.3 parts of silicone oil, as an additional surface-active agent, and 10.0 parts of an oil soluble polymer ("Paratone" 440).

EXAMPLE IV

A composition was prepared according to Example III except that the oil soluble polymer was "Acryloid" 966.

EXAMPLE V

A composition was prepared according to Example III except that the oil soluble polymer was "Lubrizol" 3702.

C. Applications

1. Paint Manufacture

The compositions of this invention are useful in the manufacture of latex and other water-base paints. A defoamer is desirable in paints to prevent entrained air bubbles occurring as a result of handling, mixing, etc., from disfiguring the coated surface. The compositions of this invention can be added to the paint formulation at any time during its manufacture in proportions of about 1 to about 5 pounds per hundred gallons of formulated paint (approximately 1.2 grams/liter to 6.0 grams/liter) and preferably at about 3 pounds per hundred gallons (approximately 3.59 grams/liter).

The evaluation of these compositions as paint defoamers was as follows. A test for holddown of foam in a paint formulation was conducted by adding the composition to be tested to a latex paint containing no defoamer and shaking on a Red Devil Mixer for ten minutes. The shaken sample was then weighed and this weight was used to calculate the density of the paint (pounds/gallon) and the volume percentage of entrapped air. These figures were then compared with those for unshaken paint, and paint shaken without any defoamer.

Test results using the above method are as follows. I. Shaker test using New London Mills' SBR paint, weighing 14.60 lbs/gal, shaken for 10 minutes with a 3.0 lb/100 gal. addition of defoamer.

| Defoamer | weight per gallon (lbs) after shaking | weight loss (lbs) | % of entrained air |
| --- | --- | --- | --- |
| 1. Example III | 14.52 | 0.08 | 0.55 |
| 2. Foamkill 639-C* | 14.48 | 0.12 | 0.82 |
| 3. According to U.S. 3,207,698 | 14.40 | 0.20 | 1.37 |
| 4. Blank | 12.12 | 2.48 | 17.00 |

*a paint defoamer sold by Crucible Chemical Company, which is a liquid nonionic having a flash point of over 149° C.

II. Shaker test using Conchemco's Deep Base No. 6212 paint, weighing 10.45 lbs/gal, shaken for 5 minutes with a 6.0 lbs/100 gals. addition of defoamer.

| Defoamer | weight per gallon (lbs) | weight loss (lbs) | % of entrained air |
| --- | --- | --- | --- |
| 1. According to U.S. 3,207,698 | 10.08 | 0.37 | 3.54 |
| 2. Example III | 9.72 | 0.73 | 6.98 |
| 3. Fales' No-Fo* | 9.23 | 1.22 | 11.68 |
| 4. Blank | 5.96 | 4.49 | 42.90 |

*a commercially available paint defoamer.

III. A further test for film appearance was conducted using Conchemco's Deep Base No. 6212 (aged samples after one week at 49° C) with an addition of 6.0 lbs/100 gals.

| Defoamer | speed of bubble break | dried film appearance | | |
| --- | --- | --- | --- | --- |
| | | bubbles | craters | pinholes |
| 1. According to U.S. 3,207,698 | fast | trace | trace | very few |
| 2. Example III | moderate | few | moderate | moderate |
| 3. Fales' No-Fo | very slow | many | many | many |
| 4. Blank | very slow | extensive | extensive | extensive |

2. Adhesives

The compositions of this invention are also useful in the manufacture of animal glue and other water-base adhesives. A defoamer is desirable in adhesives to prevent entrained air bubbles from reducing the surface contact area and thus the strength of the adhesive bond. The compositions of this invention can be added to the adhesive formulations during the blending of ingredients in proportions of .05 to 0.5 (and preferably 0.1 to 0.3) parts by weight per 100 parts by weight of adhesive solids.

The evaluation of these compositions as adhesive defoamers was as follows. All parts by weight unless otherwise indicated.

Forty parts of animal glue were combined with 60 parts of water at a temperature of 60°–71° C. While agitating at a moderate speed, 3 or 4 drops of phenol were added to the mix. Thirty-five parts of corn syrup were added to 65 parts of the above mixture, while the above temperature and agitatior were maintained. After thoroughly blending all components, the mixer was set at "high speed", at which point 0.5 parts of the defoamer to be tested was introduced. High speed mixing was continued for five minutes (temp. 65.6° C), after which the sample was set aside to cool undisturbed. After reaching room temperature, the resultant gel surface was examined for bubbles and other surface irregularities.

Test results using various defoamers in the above procedure are as follows.

| Rank (descending desirability of appearance) | Defoamer Type | Surface Appearance of Glue | |
|---|---|---|---|
| | | fine bubbles | large bubbles |
| 1 | Composition of this Invention | few | none |
| 2 | quick-chilled amide base | few | very few |
| 3 | hydrophobic silica, aluminum stearate and polyoxyalkylene base | moderate | few |
| 4 | wax and PEG 400 stearate base | moderate | few |
| 5 | 5:1 blend of nos. 2 and 3 | moderate | few |
| 6 | hydrophobic silica and polyoxyalkylene base | many | moderate |
| 7 | polyoxyalkylene and aluminum stearate base | many | many |
| 8 | same as no. 3, but with different emulsifiers | many | many |
| 9 | Blank | very many | very many |

3. Paper Manufacture

The compositions of this invention are also useful in the reduction of existing foam (knock-down) and prevention of foam formation (hold-down) which occurs in black liquor during the pulping process. When used for this purpose, from about 0.003 to about 0.5 parts by weight of defoamer solids are added to the pulp, per 100 parts by weight of dry pulp.

The following apparatus and test method was used in determining the effectiveness of various compositions in knocking down and holding down foam in black liquor. The apparatus and method could, however, be used for testing any liquid which forms a foam upon agitation and/or heating.

A 1000 cc. tall form beaker is used as the primary container for the liquid to be tested. A curved glass outlet fused onto the base of the beaker is connected with a rubber hose to a centrifugal pump. The pump is used to circulate continuously the test liquid from the beaker into the pump and back into the beaker. Pumping is carried out at a rate so that the test liquid in the beaker is agitated by the re-entering test liquid to such an extent that foam forms. The pumping rate is about two gallons per minute. Test liquid enters the beaker at a point about 6 centimeters above the surface of the liquid in the beaker and strikes the surface of the liquid in the beaker at an angle of 90°.

In carrying out the testing of the defoamer compositions, 500 cc. of freshly obtained concentrated black liquor is charged at about 75° C. into the beaker. This liquid, when quiescent, fills the beaker to a level of about 8.3 centimeters from the bottom. This level is marked and labeled the 0 line. In the test for hold down, 0.1 cc. of defoamer composition is added to the 500 cc. of test liquid in the beaker. The pump and stop watch are started simultaneously. Height of the foam above the 0 line is measured at 15 second intervals for the first minute, then at 30 second intervals, and recorded. In the test for knockdown, the liquor is agitated and heated prior to the addition of any defoamer composition. After a foam has built up to 8 centimeters, 0.1 cc. of the defoamer composition to be tested is added and the data is recorded as above.

Test results using the above method are as follows.

I. Hold-down Efficacy - Comparative Tests

| Defoamer | Seconds: From height (mm) | | | | | | | |
|---|---|---|---|---|---|---|---|---|
| | 15 | 30 | 45 | 60 | 90 | 120 | 150 | 180 |
| 1) Example I | 24 | 17 | 16 | 20 | 28 | 37 | 47 | 58 |
| 2) Example II | 9 | 1 | 4 | 10 | 17 | 25 | 34 | 44 |
| 3) Example III | 12 | 10 | 13 | 17 | 26 | 32 | 38 | 48 |
| 4) Example IV | 34 | 28 | 24 | 21 | 21 | 24 | 31 | 40 |
| 5) Commercial Silica Base | 5 | 1 | 5 | 10 | 20 | 31 | 42 | 56 |
| 6) Commercial Quick-Chilled Amide Base | 10 | 5 | 5 | 8 | 13 | 6 | 27 | 36 |

The above tests demonstrate that the compositions of this invention are effective defoamers compared to existing commercial defoamers of both the hydrophobic silica base and quick-chilled amide base types.

II. Hold-down Efficacy - Comparative Tests with Increased Quick-Chilled Amide

| Defoamer | Seconds: Foam Height (mm) | | | |
|---|---|---|---|---|
| | 15 | 30 | 45 | 60 |
| 1) 1% Quick-chilled stearic diamide of ethylene diamine + 9% hydrophobic silica | 4 | 18 | 23 | 29 |
| 2) 4% Quick-chilled stearic diamide of | 14 | 19 | 28 | 36 |

| Defoamer | Seconds: Foam Height (mm) | | | |
|---|---|---|---|---|
| | 15 | 30 | 45 | 60 |
| ethylene diamine + 9% hydrophobic silica | | | | |

The above test clearly demonstrates that increasing the amount of quick-chilled amide to the point where it may be expected to have defoaming efficacy is not useful. This indicates that the quick-chilled amide is clearly not utilized in this invention for its known property as a defoamer. In fact, it should be noted that not only does the combination of the known defoamers hydrophobic silica and quick-chilled amide not synergistically increase defoaming efficacy, it actually decreases it. D. Stability A test was designed to test the efficacy of the stabilized compositions falling within the scope of this invention as compared to compositions using other stabilizers and to non-stabilized hydrophobic silica defoamers.

A centrifuge containing the various compositions was run for 1 hour at 1,000 r.p.m. The test tubes of the centrifuge was each filled to a height of 106 mm with the compositions to be tested. The compositions of this invention, when they separated at all, usually did so into three phases: oil on top; oil and quick-chilled amide in the middle; and silica with some oil on the bottom. Compositions containing no quick-chilled amide separated into two phases: oil on top; and silica with some oil on the bottom. The first number in the following table refers to the height of the non-silica layer or layers. The second number, refers to the viscosity of the composition before centrifuging.

All of the silicas used in the following test were hydrophobic and within the scope of this invention (unless otherwise noted). It will be seen that although fine and medium particle size silicas are preferred, large particle size silica can also be used, depending on the choice of quick-chilled amide. In this test, the large particle size silica used was actually an agglomerate of medium size particles.

The first two amides in the following test are quick-chilled and within the scope of this invention. The third amide is not quick-chilled.

Since a more viscous medium is generally considered to keep particles in suspension better than one which is less viscous, viscosity was measured for each composition (the figure in parenthesis). Compositions were prepared using polybutene as a thickening agent. Although these compositions were relatively stable, it should be noted that excessively large quantities of polybutene were required (25 and 21% respectively). A composition was also prepared using a fine particle size hydrophilic silica as a thickening agent. Although this composition was relatively stable, it should be noted that such silica is extremely expensive and of limited supply. In fact, one of the advantages of this invention is that fine particle silica is not required to achieve stability. The viscosity data (in parentheses) indicates that high viscosity alone is not sufficient to stabilize the silica suspension. This is apparent from comparing stabilizers nos. 2 and 6 combined with fine silica and stabilizers nos. 2 and 4 combined with medium silica.

In interpreting the data, comparisons should be made vertically that is, amongst stabilizers using the same silica. The larger the silica, the more difficult the stabilization. Therefore, a height of 2 or less is acceptable for fine silica, a height of 5 or less is acceptable for medium silica, and a height of 10 or less is acceptable for large silica.

COMBINED HEIGHT OF PHASES ONE AND TWO (VISCOSITY)

| | Stabilizer (1%) | Silica (9%) - particle size -(oil absorption - gms/100gms) | | |
|---|---|---|---|---|
| | | Fine (250) | Medium (170–190) | Large (125–165) |
| 1) | stearic diamide of ethylene diamine (quick-chilled) | 0 (1600) | 2 (1200) | 10 (1300) |
| 2) | oleic diamide of ethylene triamine (quick-chilled) | 1 (320) | 4 (80) | 70 (60) |
| 3) | same as no. 1 but not quick-chilled | — | 13 (250) | — |
| 4) | polybutene (thickener) | 0 (860)* | 4 (460)** | — |
| 5) | 1.5% fine silica (hydrophilic) | — | 2 (840) | — |
| 6) | none | 3 (360) | 20 (160) | 70 (100) |

*25% polybutene
**21% polybutene

We claim:

1. In an aqueous system defoamer composition containing from 3 to 20% by weight of hydrophobic silica suspended in a carrier liquid, the improvement comprising the addition of a quick-chilled amide in a quantity of from 0.1 to 2.0% by weight so that the hydrophobic silica/carrier liquid suspension is stabilized.

2. The improvement of claim 1 with the addition of up to 25% by weight of an oil soluble organic polymer.

3. The improvement of claim 1 with the addition of up to 3.0% by weight of a surface-active additive.

4. The improvement of claim 1 in which the quick-chilled amide is the reaction product of ethylenediamine and tallow fatty acid.

5. The improvement of claim 1 in which the hydrophobic silica has an oil absorption value of more than 170 grams per 100 grams of silica.

6. The improvement of claim 1 in which the carrier liquid is paraffinic mineral oil.

7. The improvement of claim 2 in which the oil soluble organic polymer is a copolymer of vinyl acetate and fumaric acid esterified with a tallow alcohol.

8. The improvement of claim 2 in which the oil soluble organic polymer is a copolymer of styrene and a polyester.

9. The improvement of claim 2 in which the oil soluble organic polymer is a copolymer of alkyl methacrylate and N-vinyl pyrrolidone.

10. A process of manufacturing a hydrophobic silica base defoamer having improved stability comprising: heating a carrier liquid to at least 100° C; adding hydrophobic silica thereto and blending, so as to form a temporarily stable suspension; cooling the suspension to about room temperature or below; heating separately an amide optionally mixed with carrier liquid until the amide is melted or dissolved in the carrier liquid; maintaining the temperature of the amide for at least 15 minutes; rapidly adding the amide to the suspension so as to quick-chill the amide; and homogenizing the hydrophobic silica/carrier liquid/quick-chilled amide mixture at a pressure of from 1,000 to 5,000 p.s.i.

11. A process according to claim 10 in which an oil soluble organic polymer is added after homogenization.

12. A process according to claim 10 in which a surface-active agent is added after homogenization.

13. A method of defoaming black liquor present in paper manufacture comprising adding thereto from about 0.003 to about 0.5 parts by weight of the solids of the composition of claim 1 per 100 parts by weight of dry paper pulp.

14. A method of foam prevention in water-base paints comprising incorporating therein from about 1.2 grams to about 6.0 grams of the composition of claim 1 per liter of paint.

15. A method of foam prevention in water base adhesives comprising incorporating therein from about 0.05 to about 0.5 parts by weight of the composition of claim 1 per 100 parts by weight of adhesive solids.

* * * * *

UNITED STATES PATENT AND TRADEMARK OFFICE
CERTIFICATE OF CORRECTION

PATENT NO. : 4,021,365
DATED : May 3, 1977
INVENTOR(S) : Joseph V. Sinka and Irwin A. Lichtman It is certified that error appears in the above-identified patent and that said Letters Patent are hereby corrected as shown below:

Column 1, line 18, "fien" should be --fine--. Column 2, line 50, "25%C" should be --25°C--. Column 3, line 22, "substnace" should be --substance--. Column 4, line 2, after "under" insert --a--; column 4, line 25, after "colder" insert --carrier--. Column 5, line 6, "/0" should be --70--; column 5, line 17, "as" should be --an--; column 5, line 62, "heptamcenyl" should be --heptadecenyl--. Column 6, line 12, "monoarchidate" should be --monoarachidate--; column 6, line 57, "it" should be --is--. Column 9, line 3, omit --the-- (first occurrence); column 9, line 8, after "parts" insert --are--; column 9, line 15, "agitatior" should be --agitation--; column 9, line 19, "65.6°C" should be --65.5°C--. Column 10, line 24, heading in Table I, "From" should be --Foam--; column 10, line 50, in the table under table heading "120", "6" should be --16--; column 10, line 64, in the table under table heading "15", "4" should be --14--.

Signed and Sealed this

Twenty-first Day of February 1978

[SEAL]

Attest:

RUTH C. MASON
Attesting Officer

LUTRELLE F. PARKER
Acting Commissioner of Patents and Trademarks